United States Patent [19]

Harada et al.

[11] 4,403,081

[45] Sep. 6, 1983

[54] METHOD FOR PRODUCING α-OLEFIN POLYMERS

[75] Inventors: Masato Harada, Kisarazushi; Akihiro Sato, Chibaken; Sadahiko Yamada, Ichiharashi; Kazutsune Kikuta, Ichiharashi; Atsushi Suzuki, Ichiharashi; Hiroshi Shimizu, Chibaken; Jun Masuda, Ichiharashi; Tadamitsu Hamasaki, Ichiharashi; Atsuyuki Kachi, Ichiharashi, all of Japan

[73] Assignee: Chisso Corporation, Osaka, Japan

[21] Appl. No.: 13,522

[22] Filed: Feb. 21, 1979

[30] Foreign Application Priority Data

Feb. 25, 1978 [JP] Japan .................................. 53-21246
Feb. 25, 1978 [JP] Japan .................................. 53-21247
May 11, 1978 [JP] Japan .................................. 53-55757

[51] Int. Cl.$^3$ .......................... C08F 4/02; C08F 10/00
[52] U.S. Cl. ............................... 526/115; 252/429 B; 526/97; 526/114; 526/121; 526/122; 526/124; 526/125; 526/347; 526/348; 526/348.6; 526/351; 526/352
[58] Field of Search ................ 526/97, 114, 115, 122, 526/121, 124, 125

[56] References Cited

U.S. PATENT DOCUMENTS

| 3,658,722 | 4/1972 | Delbouillo et al. | 526/124 |
| 3,900,454 | 8/1975 | Sato et al. | 526/124 |
| 3,987,233 | 10/1976 | Sato et al. | 526/125 |
| 4,027,087 | 5/1977 | Satoh et al. | 526/116 |
| 4,103,078 | 7/1978 | Sato et al. | 526/124 |
| 4,105,847 | 8/1978 | Ito et al. | 526/128 |
| 4,107,414 | 8/1978 | Giannini et al. | 526/124 |
| 4,107,416 | 8/1978 | Giannini et al. | 526/125 |
| 4,144,390 | 3/1979 | Derroitte et al. | 526/124 |

FOREIGN PATENT DOCUMENTS

| 50-44273 | 4/1975 | Japan | 526/125 |
| 1464909 | 2/1977 | United Kingdom | 526/125 |

Primary Examiner—Edward J. Smith
Attorney, Agent, or Firm—Fred Philpitt

[57] ABSTRACT

A method for producing α-olefin polymers is provided. This method provides products having superior properties such as higher bulk density and uniform particle form which is close to sphere, with such an extremely higher catalyst efficiency that ash-removal step can be omitted without fear of coloring. The characteristic point of this method is in the improvement of conventional catalyst obtained by reacting a trivalent metal halide with a divalent metal hydroxide, oxide or carbonate or a double salt containing foregoing compounds or a hydrate of a compound containing a divalent metal to form a solid product (I), reacting an electron donor with said product (I), reacting the resulting product with a compound of transition metal of the 4th a or the 5th a group to form a final solid product and combining an organoaluminum compound with said final product, the improvement consisting in that said final product is obtained by reacting said solid product (I), said electron donor and said compound of transition metal, in the coexistence of said electron donor and said compound of transition metal.

9 Claims, No Drawings

METHOD FOR PRODUCING α-OLEFIN POLYMERS

DESCRIPTION OF THE INVENTION

The present invention relates to a method for producing α-olefin polymers having superior properties and form, with an extremely high catalyst efficiency, and a solid catalyst component of the catalyst employed in the method.

The polymerization and polymers of α-olefins referred to in the present invention mean not only the homopolymerization and the homopolymers of α-olefins, but also the copolymerization and copolymers with other copolymerizable, α-olefins, respectively.

In producing ethylene polymers by the use of Ziegler type catalyst, it is known to use a polysiloxane as a component of the catalyst. For example, it has been known to obtain a catalyst by adding a polysiloxane to a catalyst system consisting of a compound of transition metal and an alkylaluminum, a catalyst by combining a reaction product of a polysiloxane with aluminum trichloride or the like, with a compound of transition metal, a catalyst by reacting a compound of transition metal with aluminum trichloride or the like, thereafter adding a polysiloxane to the resulting reaction product and reacting them together, or the like catalysts. On the other hand, the present inventors have heretofore developed, as catalysts for ethylene polymerization, those which are used by causing a compound of transition metal to be supported on a solid product obtained by reacting a trivalent metal halide with a divalent metal compound, in various manners. As one of them, an invention relating to a method of ethylene polymerization wherein a catalyst obtained by reacting at first a polysiloxane with the above-mentioned solid product, then reacting a compound of transition metal with the resulting product, and combining the resulting final solid product with an organoaluminum compound is disclosed in U.S. Pat. No. 3,987,233 (this invention will be hereinafter referred to as the prior invention).

The above-mentioned catalyst employed in the prior invention is different from the above-mentioned various catalysts having a polysiloxane employed therein, in that, in preparing the catalyst component having a compound of transition metal supported thereon, a polysiloxane is reacted with a solid product formed by the chemical reaction of a trivalent metal halide (e.g. aluminum trichloride) with a divalent metal compound, and containing no trivalent metal halide, and further in that thereafter the resulting reaction product is reacted with a compound of transition metal. Further the catalyst of the prior invention is superior in the effectiveness such as catalyst activity, bulk density, etc.

The present inventors have made various studies on the improvement in the prior invention, and as a result have found that the effectivenesses can be improved to a large extent by varying the reaction manner of said polysiloxane, said compound of transition metal and said solid product (I), and also that even when electron donors other than said polysiloxane are employed, almost the same effectivenesses can be exhibited, and thus have attained the present invention.

The object of the present invention is to provide a method for polymerizing α-olefins, having superior effectivenesses to those of the prior invention, and a solid catalyst component of the catalyst employed in the method.

The present invention resides in:
the improvement in the method for producing α-olefin polymers employing a catalyst obtained by
reacting a trivalent metal halide with a divalent metal hydroxide, oxide or carbonate or a double salt containing these compounds or a hydrate of a compound containing a divalent metal (these compounds will summarily be referred to herein as divalent metal compounds), to form a solid product (I); thereafter
reacting an electron donor with the resulting product (I); thereafter
reacting with the thus obtained product, a compound of transition metal of the 4th a or 5th a group of the Periodical Table, to form a final solid product; and then
combining an organoaluminum compound with said final solid product,
said improvement being characterized in that as said final solid product, a solid product (II) which is obtained by reacting said solid product (I), said electron donor and said compound of transition metal in the coexistence of said electron donor and said compound of transition metal is employed;
and the present invention resides also in a solid catalyst component consisting of a solid product (II) as described above.

As for said trivalent metal halide, aluminum trichloride (anhydrous) and ferric chloride (anhydrous) are exemplified.

As for said divalent metal compound, for example, hydroxides such as $Mg(OH)_2$, $Ca(OH)_2$, $Zn(OH)_2$, $Mn(OH)_2$, oxides such as MgO, CaO, ZnO, MnO, double oxides containing divalent metals such as $MgAl_2O_4$, $Mg_2SiO_4$, $Mg_6MnO_8$, carbonates such as $MgCO_3$, $MnCO_3$, $CaCO_3$, halogenated hydrates such as $SnCl_2.2H_2O$, $MgCl_2.6H_2O$, $NiCl_2.6H_2O$, $MnCl_2.4H_2O$, $KMgCl_3.6H_2O$, hydrates of double salts containing an oxide and a halide such as $MgCl_2.nMgO.mH_2O$ (n=1-3, m=1-6), hydrates of double salts containing a divalent metal oxide such as $3MgO.2SiO_2.2H_2O$, hydrates of double salts of a carbonate with a hydroxide such as $3MgCO_3.Mg(OH)_2.3H_2O$ and hydrates of a hydroxide-carbonate containing a divalent metal such as $Mg_6Al_2(OH)_{16}CO_3.4H_2O$, etc. are mentioned.

For reacting a trivalent metal halide with a divalent metal compound, it is preferable to carry out mixing and milling in advance, for 5-100 hours in case of a ball mill and for 1-10 hours in case of a vibration mill to bring them into a sufficiently mixed state. As for the mixing proportion of the trivalent metal halide with the divalent metal compound, usually a range of 0.1-20 as expressed by an atomic ratio of a divalent metal to a trivalent metal is sufficient, and a range of 1-10 is preferable.

The reaction temperature is usually 20°-500° C., preferably 50°-300° C. The reaction time is suitably 30 minutes to 50 hours. If the reaction temperature is lower, the reaction is carried out for a long time so that unreacted divalent metal does not remain. The thus obtained solid product will be referred to as a solid product (I).

Next, said solid product (I), an electron donor and a compound of transition metal are reacted in the coexisting state of said electron donor and said compound of transition metal. Subsequent reactions to this are all carried out in an inert gas atmosphere such as nitrogen.

In the present invention, polysiloxanes are most preferably employed as said electron donor. Such polysiloxanes are chain or cyclic siloxane polymers expressed by the general formula

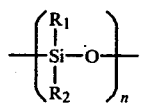

(wherein n represents 3–10,000), and $R_1$ and $R_2$ represent the same or different kinds of residual groups capable of being combined to Si, and above all, those in which one kind, two kinds or more of hydrogen, hydrocarbon residual group such as alkyl group, aryl group, etc., halogen, alkoxy group, aryloxy group, fatty acid residual group, etc. are distributed and combined in a molecule may be employed.

Commonly employed polysiloxanes are those wherein each R in the above-mentioned formula is a hydrocarbon residual group, and as concrete examples, alkylsiloxane polymers such as lower polymers e.g. octamethyltrisiloxane $CH_3[Si(CH_3)_2O]_2Si(CH_3)_3$, octaethylcyclotetrasiloxane $[Si(C_2H_5)_2O]_4$, etc. and lower polymers e.g. dimethylpolysiloxane $[Si(CH_3)_2O]_n$, ethylpolycyclosiloxane $[SiH(C_2H_5)O]_n$, methylethylpolysiloxane $[Si(CH_3)(C_2H_5)O]_n$, etc., further arylsiloxane polymers such as hexaphenylcyclotrisiloxane $[Si(C_6H_5)_2O]_3$, diphenylpolysiloxane $[Si(C_6H_5)_2O]_n$, etc. and further alkylarylsiloxane polymers such as diphenyloctamethyltetrasiloxane $(CH_3)_3SiO[Si(CH_3)(C_6H_5)O]_2Si(CH_3)_3$, methylphenylpolysiloxane $[Si(CH_3)(C_6H_5)O]_n$, etc. are illustrated.

Besides, those wherein $R_1$ is hydrogen or halogen and $R_2$ is a hydrocarbon residual group such as alkyl group, aryl group, etc., e.g. alkylhydrogensiloxane polymers, haloalkylsiloxane polymers, haloarylsiloxane polymers, etc. are illustrated. Further, polysiloxanes wherein each R is alkoxy or aryloxy group or fatty acid residual group can be also employed.

It is also possible to employ these various polysiloxanes in admixture with each other.

Polysiloxanes employed are preferably liquid ones, and the viscosity (at 25° C.) is suitably in the range of 10–10,000 centistokes, preferably 10–10,000 centistokes.

As for other electron donors, oxygen-containing electron donors such as ethers (R-O-R'), esters (RCO₂R'), aldehydes (RCHO), ketones (RCOR'), carboxylic acids (RCO₂H), carboxylic anhydride (R-CO₂CO-R'), carboxylic amide (RCONH₂), etc., nitrogen-containing electron donors such as amines ($R_nNH_{3-n}$[n=1-3]), nitriles (RCN), etc., phosphorus-containing electron donors such as phosphines ($R_nPR'_{3-n}$[n=1-3]), phosphorus oxytrichloride (POCl₃), etc., sulfur-containing electron donors such as thioethers ($R_nSR'_{2-n}$[n=1-2]), etc. may be employed. Above all, ethers, esters, aldehydes, ketones and carboxylic anhydrides are preferable. It is possible to employ these electron donors alone or in admixture of two or more kinds, and it is also possible to employ them in admixture with polysiloxanes.

In the above-mentioned general formulas, R and R' each represent a hydrocarbon group, and more particularly, an aliphatic hydrocarbon group, an unsaturated hydrocarbon group, a monocyclic hydrocarbon group having no substituent, a monocyclic hydrocarbon group having substituent(s), a condensed polycyclic hydrocarbon group, etc., each having 1–50 carbon atoms, are mentioned. As for aliphatic hydrocarbon group, straight chain groups such as methyl, ethyl, propyl, butyl, phentyl, hexyl, octyl, etc., and branched groups such as isopropyl, isobutyl, isopentyl, isohexyl, isooctyl, 2-methylpentyl, 3-mehtylpentyl, 5-methylhexyl, etc. are mentioned. As for unsaturated hydrocarbon group, there are alkenyl group and alkadienyl group, and not only those having an unsaturated bond at the terminals but also those having it inside the chain or molecule are included. For example, vinyl, allyl, isopropenyl, 1-propenyl, 2-butenyl, 1,3-butadienyl, etc. are mentioned. As for monocyclic hydrocarbon group, alicyclic and aromatic hydrocarbon groups are included, and as examples of those having no substituent, alicyclic hydrocarbon groups such as cyclopropyl, cyclohexyl, 2-cyclopenten-1-yl, etc. and phenyl group are mentioned. As examples of those having substituent(s), toluyl, xylyl, mesityl, cumyl, benzyl, dimethylmethyl, phenetyl, styryl, etc. are mentioned. As examples of condensed polycyclic hydrocarbon group, naphthyl, anthryl, phenanthryl, 2-indenyl,1-pyrenyl, etc. are mentioned.

Concrete examples of the above-mentioned electron donor will be illustrated below:

As ethers, diethyl ether, dipropyl ether, dibutyl ether, di(isoamyl)ether, ethylene glycol dimethyl ether, diethylene glycol dimethyl ether, diethylene glycol diethyl ether, diphenyl ether, tetrahydrofuran, etc.; as esters, ethyl acetate, butyl acetate, amyl acetate, vinyl lactate, vinyl acetate, methyl propionate, methyl benzoate, ethyl benzoate, propyl benzoate, butyl benzoate, octyl benzoate, 2-ethylhexyl benzoate, methyl toluylate, ethyl toluylate, butyl toluylate, 2-ethylhexyl toluylate, methyl anisate, ethyl anisate, propyl anisate, methyl naphthoate, ethyl naphthoate, propyl naphthoate, butyl naphthoate, 2-ethylhexyl naphthoate, etc.; as aldehydes, butyraldehyde, propionic aldehyde, benzaldehyde, etc.; as ketones, methyl ethyl ketone, diethyl ketone, acetyl acetone, acetophenone, benzophenone, etc.; as carboxylic acids, acetic acid, propionic acid, benzoic acid, etc.; as carboxylic anhydrides, acetic anhydride, butyric anhydride, benzoic anhydride, etc.; as carboxylic amide, formamide, acetamide, benzamide, etc.; as amines, methylamine, dimethylamine, trimethylamine, amylamine, aniline, methylaniline, pyridine, etc.; as nitriles, acetonitrile, propionitrile, benzonitrile, etc.; as phosphines, triethylphosphine, triphenylphosphine, etc.; and as thioethers, diethylsulfide, diphenylsulfide, etc. can be mentioned.

As for the compound of transition metal, halides, oxyhalides, alcoholates, alkoxyhalides, acetoxyhalides, etc. of titanium or vanadium are mentioned, and for example titanium tetrachloride, titanium tetrabromide, tetraethoxytitanium, tetrabutoxytitanium, monochlorotributoxytitanium, dichlorodibutoxytitanium, trichloromonoethoxytitanium, vanadium tetrachloride, vanadium oxytrichloride, etc. are illustrated.

As for the properties of said solid product (I), said electron donor and said compound of transition metal, employed, the electron donor is employed in an amount of 10–10,000 g, preferably 20–1,000 g, based on 100 g of said solid product (I), and said compound of transition metal is employed in an amount of 1–1,000 g, preferably 10–500 g based on 100 g of said solid product (I) and in an amount of 10–5,000 g, preferably 30–500 g based on 100 g of the electron donor.

In order to react said solid product (I), said electron donor and said compound of transition metal, in the coexistence of the latter two, there are various manners as mentioned below. In any of these manners, it is not always necessary to employ solvent. But since it is preferable to react them uniformly, the optional one or two or the total of the above-mentioned components may be admixed by dissolving or dispersing in a solvent in advance. As for the amount of the solvent used, those which are about 10 times (by weight) or less the total amount of the dissolved or dispersed component(s) are sufficient.

As for the solvent employed, aliphatic hydrocarbons such as hexane, heptane, octane, nonane, decane, etc.; aromatic hydrocarbons such as benzene, toluene, xylene, ethylbenzene, cumene, etc.; halogenated aromatic hydrocarbons such as chlorobenzene, dichlorobenzene, trichlorobenzene, etc.; and halogenated hydrocarbons such as carbon tetrachloride, chloroform, dichloroethane, trichloroethylene, tetrachloroethylene, carbon tetrabromide, etc. are mentioned.

After completion of the reaction, the resulting product is filtered off, in a conventional manner, repeatedly washed with a solvent as mentioned above, to remove unreacted compound of transition metal and electron donor, followed by drying to obtain a solid product (II).

As for concrete methods for the formation reaction of said solid product (II), the following embodiments can be employed:

(1) Said solid product (I), an electron donor and a compound of transition metal are at the same time admixed and reacted together.
(2) Said solid product (I) is mixed with said electron donor, and then said compound of transition metal is added to the mixture, and thereafter reacted therewith.
(3) Said solid product (I) is mixed with said compound of transition metal, and then said electron donor is added to the mixture and subjected to reaction.
(4) Said electron donor is mixed with said compound of transition metal and then said solid product (I) is mixed with the resulting mixture to subject to reaction.

In any case of the above-mentioned methods, it is possible to carry out the reaction in the presence or absence of a solvent.

The mixing is carried out suitably at $-50°$ C.$\sim +30°$ C., and most usually at room temperature (about 20° C.). It is preferable to carry out the mixing with stirring.

After the mixing, reaction is carried out with stirring at 30°–300° C., preferably 50°–200° C., for 10 minutes–30 hours. In case of the above-mentioned embodiment (4), the above-mentioned temperature range can, of course, be preferably employed as a mixing temperature of said electron donor with said compound of transition metal, but a mixing temperature range exceeding the above-mentioned and up to 100° C. may be employed, to effect or promote the reaction of said electron donor with said compound of transition metal, as a particular embodiment in the coexistence of these two. Further in case of the embodiment (4), the proportion of the three component substances employed is as generally mentioned above, but if a case where a polysiloxane is employed as said electron donor is particularly picked up and shown because of convenience to the reaction procedure, the amount of said solid product (I) employed, to be reacted with a polysiloxane and said compound of transition metal is 0.1–900 g, preferably 7–330 g, based upon 100 g of the reaction product of the latter two.

After the formation reaction of said solid product (II), the resulting product is filtered off in a conventional manner, washed with a solvent, to remove the unreacted compound of transition metal and the electron donor, and dried, as mentioned above, to obtain said solid product (II).

This solid product (II) is combined with an organoaluminum compound to form a catalyst for α-olefin polymerization.

As for the organoaluminum compound, trialkylaluminums such as trimethylaluminum, triethylaluminum, triisobutylaluminum, trihexylaluminum, etc., dialkylaluminum monochlorides such as diethylaluminum monochloride, etc., ethylaluminum sesquichloride, ethylaluminum dichloride, etc. are mentioned, and it is also possible to employ alkoxyalkylaluminums such as monoethoxydiethylaluminum, diethoxymonoethylaluminum, etc.

The catalyst obtained as mentioned above is employed for producing α-olefin polymers. In the present invention, α-olefins referred to herein mean straight chain monoolefins such as ethylene, propylene, butene-1, hexene-1, octene-1, decene-1 or the like and branched monoolefins such as 4-methyl-pentene-1 or the like, and according to the present invention, not only the homopolymerization thereof, but also the copolymerization of these two or more copolymerizable α-olefins or the copolymerization thereof with diolefins such as butadiene or the like can be effectively carried out.

The polymerization reaction is carried out usually in a hydrocarbon solvent such as n-hexane, n-heptane, n-octane or the like. As for the polymerization temperature, room temperature (about 30° C.)–150° C., preferably 60°–120° C. are employed, and as for the polymerization pressure, atmospheric pressure-50 Kg/cm$^2$, preferably 5–40 Kg/cm$^2$ are employed. At the time of the polymerization, it is possible to add a proper amount of hydrogen to the polymerization system to control the molecular weight.

As for the effectivenesses of the present invention, firstly the yield of α-olefin polymers per g of the solid product (II) is sufficiently high, and particularly in case of ethylene polymers, the yield amounts to $5 \times 10^4$–$9 \times 10^4$ g (polymer)/g of solid product (II), and further $4 \times 10^7$ g (polymer)/g of transition metal in the solid product (II), under usual polymerization conditions. Thus, by reducing the catalyst amount employed in the polymerization to a small amount, even when the removal of residual catalyst in the resulting ethylene polymer i.e. the ash-removal (deashing) step is omitted after completion of the ethylene polymerization, the polymer has no coloration, and also pellets obtained by granulation have no coloration, and further there are no deterioration of physical properties of the polymer not rusting of mold at the time of molding of the polymer nor adherence of degraded colored resin onto the exit of mold.

According to the method of the above-mentioned prior invention U.S. Pat. No. 3,987,233, the yield of ethylene polymers per solid product is $2 \times 10^3$–$5 \times 10^4$ g (polymer) per g of final solid product under usual polymerization conditions, whereas the yield is improved to a large extent, whereby the catalyst amount employed can be reduced down to a further smaller amount and hence the above-mentioned effectivenesses are more remarkable.

The coloration degree of the polymers can be expressed by yellowness index (JIS K7103-1970 which will be hereinafter abbreviated to YI). Those having a YI of 10 or more are difficult to employ for practical uses. If YI is in the range of 0–5, even when the ash-removal step is omitted, the resulting polymers are scarcely colored, and can be sufficiently employed for practical uses. According to the present invention, even the ash-removal step is omitted, YI is in the range of −0.2 to +0.5 and polymers having an extremely small coloration can be obtained.

The second effectiveness of the present invention is in that the form of the ethylene polymer particle is very good. Whether the form of polymer particle is superior or inferior, has influences upon the production efficiency per volume of polymerization vessel per hour, upon whether or not occurrence of trouble is liable at the time of transportation of polymer through pipes, and also upon whether granulation of polymer particle is easy or not. The "good" form or "superiority" of polymer particle referred to herein means a state where the polymer particle is spherical or has a form close to sphere, and its surface is smooth, while the "inferiority" of the polymer form means a state where the polymer particle is not spherical and its convex and concave are remarkable and its surface is not smooth. The superiority or inferiority of the polymer form can be roughly judged through a macro-observation by means of measurement of bulk density (which will be hereinafter abbreviated to BD) of polymer powder, but the superiority or inferiority of the form can be known more in detail through a micro-observation by means of enlargement of the particle by microscope. BD is preferably 0.35 or more. BD obtained according to the present invention amounts to 0.35–0.47 which are sufficiently high, and the particle has a spherical form or a form close thereto and also its surface is smooth.

The third effectiveness of the present invention is in the fact that highly crystalline polymers can be obtained in the production of α-olefin polymers. For example, in case of production of propylene polymers, according to the method of the prior invention made by the present inventors, the isotactic index showing a proportion of n-heptane-solubles was 0.75–0.88, whereas according to the present invention, the isotactic index has been improved up to 0.87–0.92.

Other effectivenesses of the present invention are in the fact that the adherence of polymer onto the wall of polymerization vessel in the ethylene polymerization does not occur at all or scarcely occurs, and a long time continuous polymerization is effected in the same polymerization vessel, and also in the fact that even when the amount of organoaluminum employed, to be combined with the solid product (II) is reduced, it is possible to obtain a sufficietly high catalyst efficiency, and further that a new polymerization method which is useful for either of polymerization of ethylene or polymerization of α-olefins other than ethylene could have been provided.

The following Examples 1–22 are those wherein a polysiloxane was employed as an electron donor, and the above-mentioned embodiment (1) was carried out, i.e. the solid product (I), the polysiloxane and the compound of transition metal were at the same time admixed and reacted.

EXAMPLE 1

(1) Preparation of solid product (II)

Eighty grams of aluminum trichloride (anhydrous) and 58 g of magnesium hydroxide were mixed and milled in a vibration mill for 5 hours, and heated at 130° C. for 10 hours. As a result, reaction occurred with accompaniment of dehydrochlorination. After completion of the heating, cooling and milling were carried out to obtain fine particle of solid product (I).

100 Grams of the solid product (I), 100 g of dimethylpolysiloxane (Toshiba Silicone Oil TSF 450-100 (trademark), viscosity: 100 centistokes) and 100 ml (173 g) of titanium tetrachloride were at the same time added to 100 ml of toluene at room temperature, followed by mixing with stirring. With continuous stirring, they were reacted together by heating to 110° C. for 2 hours. After completion of the reaction, the resulting product was separated by filtration, and repeatedly washed 4 times employing 200 ml of hexane each time. As a result, unreacted titanium tetrachloride and unreacted polysiloxane came to be not detected in the filtrate. Vacuum drying was then carried out to obtain 85 g of solid product (II). The content of titanium atom in 1 g of solid product (II) was 6.5 mg.

(2) Polymerization of ethylene 3.5 L of n-hexane, 114 mg of triethylaluminum and 25 mg of solid product (II) were introduced into a stainless steel polymerization vessel, and subjected to polymerization reaction under a hydrogen pressure (gauge) of 3 kg/cm$^2$ and an ethylene pressure (gauge) of 10 kg/cm$^2$ (the total gauge pressure: 13.8 kg/cm$^2$), at a polymerization temperature of 85° C. and for 5 hours, followed by separating the resulting slurry by filtration without deashing (ash-removal), and drying to obtain 1,605 g of white ethylene polymer.

The polymer yield was 64,200 g (polymer)/g (solid product (II)) and $9.9 \times 10^6$ g (polymer)/g (Ti atom), and hence the catalyst efficiency was very high. The polymer obtained had a BD of 0.47, and the particle had a spherical form and a uniform particle diameter as well as a smooth surface as measured by a microscope. Although deashing step was omitted, the polymer was white and had a YI of −0.1. The polymer had a melt index (according to ASTM D-1238 (E)) (which will be hereinafter abbreviated to MI) was 5.0. Further no adherence of the polymer onto the wall of the reaction vessel and the stirrer was observed.

Comparative test 1

Comparison was made by preparing a catalyst and producing an ethylene polymer according to Example 1 described in (U.S. Pat. No. 3,987,233).

Namely, 100 g of solid product (I) obtained in Example 1 was reacted with 100 g of dimethylpolysiloxane (the same product as that in Example 1) in 100 ml of toluene, at 120° C. for 2 hours, followed by decantation and repeated washings with hexane. Successively the resulting material was reacted with 200 ml (345 g) of titanium tetrachloride at 110° C. for one hour, followed by washing with hexane and vacuum drying to obtain a final solid product. (Such a titanium-containing catalyst component to be combined with an organoaluminum in Comparative tests will be referred to as a final solid product.)

Employing 37 mg of this final solid product and 380 mg of triethylaluminum, ethylene polymerization was carried out in the same manner as in Example 1.

Comparative test 2

Employing 25 mg of the final solid product obtained in Comparative test 1 and 114 mg of triethylaluminum, polymerization was carried out as in Example 1.

In comparison of Comparative test 1 with Comparative test 2, the former is higher in the polymer yield. Namely, in order to employ the final solid product obtained in Comparative test 1 as a catalyst component, with a good efficiency, it is necessary that the ratio of an organoaluminum to be combined therewith, employed, (i.e. organoaluminum: final solid product) is higher than that of Comparative test 2 (the ratio of the Comparative test 2 being 114:25, which is same as in Example 1, while that of Comparative test 1 being 380:37). This shows that the solid product (II) obtained in Example 1 has a superior effectiveness to that of the final solid component obtained in Comparative test 1 in that the amount of the organoaluminum compound to be combined therewith employed, in the former is smaller than that in the latter.

EXAMPLE 2

100 Ml of benzene, 100 g of solid product obtained in Example 1, 20 g of ethylhydrogenpolysiloxane (100 centistokes) and 10 g of titanium tetrachloride were at the same time admixed together at room temperature, and then reacted on heating at 60° C. for 5 hours to obtain 100 g of solid product (II).

3.5 L of n-heptane, 250 mg of triisobutylaluminum and 25 mg of solid product (II) were introduced into a polymerization vessel and subjected to polymerization reaction under a hydrogen gauge pressure of 1.5 kg/cm$^2$ and an ethylene gauge pressure of 10 kg/cm$^2$ (the total gauge pressure: 12.2 kg/cm$^2$), at 75° C. for 6 hours.

EXAMPLE 3

100 Grams of solid product (I) of Example 2, 1000 g of methylethylpolysiloxane (300 centistokes) and 500 g of titanium tetrachloride were at the same time admixed together at room temperature, and then reacted with stirring on heating at 80° C. for 3 hours to obtain 90 g of solid product (II). Ethylene was polymerized as in Example 2.

EXAMPLE 4

80 Grams of aluminum trichloride (anhydrous) and 75 g of magnesium oxide were admixed and milled in a ball mill for 24 hours, and then heated at 50° C. for 50 hours, followed by cooling and grinding to obtain solid product (I).

150 Grams of solid product (I), 75 g of dimethylpolysiloxane (same as in Example 1) and 75 ml (129 g) of titanium tetrachloride were at the same time added into 150 ml of hexane, and then reacted at 50° C. for 10 hours to obtain 125 g of solid product (II).

Employing 25 mg of this solid product (II), ethylene was polymerized as in Example 1.

Comparative test 3

Employing the solid product (I) obtained in Example 4, preparation of final solid product and production of ethylene polymer were carried out as in Comparative test 1.

EXAMPLE 5

Preparation of solid product (II) and production of ethylene polymer were carried out as in Example 1 except that 80 g of magnesium carbonate was employed in place of magnesium hydroxide in Example 1.

Comparative test 4

Employing the same solid product (I) as in Example 5 and in the same manner as in Comparative test 1, preparation of final solid product and production of ethylene polymer were carried out.

EXAMPLE 6

80 Grams of aluminum trichloride (anhydrous) and 65 g of magnesium chloride (hexahydrate salt) were mixed and milled in a vibration mill for 2 hours, and then reacted on heating at 150° C. for 3 hours, followed by cooling and milling to obtain solid product (I).

150 Grams of solid product (I), 200 g of dimethylpolysiloxane and 200 ml (345 g) of titanium tetrachloride were at the same time introduced into a reactor and then reacted at 200° C. for 20 minutes, followed by cooling. While passing nitrogen gas through the reactor, 200 ml of cumene was added and stirring was carried out at 100° C. for 30 minutes. The cumene solution was then filtered, and the resulting material was repeatedly washed with benzene, followed by vacuum drying on heating at 50° C. to obtain 110 g of solid product (II).

Ethylene was polymerized as in Example 1.

Comparative test 5

Employing the solid product (I) of Example 6, preparation of final solid product and production of ethylene polymer were carried out as in Comparative test 1.

EXAMPLE 7

Preparation of solid product (II) and production of ethylene polymer were carried out as in Example 1 except that 75 g of ferric chloride (anhydrous) was employed in place of aluminum trichloride (anhydrous) in Example 1.

Comparative test 6

Employing the solid product (I) of Example 7, a final solid product was prepared as in Comparative test 1 and production of ethylene polymer was produced.

EXAMPLE 8

70 Grams of ferric chloride (anhydrous) and 65 g of hydromagnesite (3MgCO$_3$.Mg(OH)$_2$.3H$_2$O) were admixed and milled in a vibration mill for 10 hours, and then heated at 300° C. for one hour, followed by cooling and milling to obtain solid product (I).

150 Grams of solid product (I), 100 g of methylphenylpolysiloxane (viscosity: 500 centistokes) and 100 ml (182 g) of vanadium tetrachloride were at the same time added to 200 ml of xylene, and then reacted in nitrogen atmosphere at 130° C. for one hour to obtain 105 g of solid product (II).

Ethylene was polymerized as in Example 1.

Comparative test 7

Employing the solid product (I) of Example 8, a final solid product was prepared and production of ethylene polymer was carried out, as in Comparative test 1.

EXAMPLE 9

80 Grams of aluminum chloride (anhydrous) and 70 g of hydrotalcite ($Mg_6Al_2(OH)_{16}CO_3.4H_2O$) were admixed and milled in a ball mill for 48 hours, and then heated at 120° C. for 4 hours, followed by cooling and milling to obtain solid product (I).

150 Grams of solid product (I), 75 g of diphenylpolysiloxane (viscosity: 1000 centistokes) and 100 ml (183 g) of vanadium oxytrichloride were at the same time added to 150 ml of trichlorobenzene at room temperature and admixed together, followed by reaction at 180° C. for 30 minutes to obtain 107 g of solid product (II).

Ethylene was polymerized as in Example 1.

EXAMPLE 10

120 Grams of aluminum trichloride and 80 g of hydromagnesite were mixed and milled in a vibration mill for 5 hours and then heated in nitrogen current at 140° C. for 8 hours, followed by cooling and further milling in a vibration mill for one hour to obtain fine solid product (I).

150 Grams of solid product (I), 50 g of methylhydrogenpolysiloxane (Toshiba silicone oil TSF 484 (trademark); viscosity: 16 centistokes) and 50 ml (86 g) of titanium tetrachloride were at the same time added to 200 ml of toluene and admixed together, and then reacted in nitrogen atmosphere at 100° C. for 2 hours to obtain 145 g of solid product (II). Ethylene was polymerized as in Example 1.

EXAMPLE 11

90 Grams of aluminum trichloride and 76 g of magnesium hydroxide were reacted together in a vibration mill on heating at 130° C. for 3 hours, followed by cooling and then milling to obtain 150 g of solid product (I).

150 Grams of solid product (I), 70 g of methylhydrogenpolysiloxane (same as in Example 10) and 35 ml (60 g) of titanium tetrachloride were at the same time added to 150 ml of toluene and admixed together, followed by reaction in nitrogen atmosphere at 80° C. for 3 hours to obtain 150 g of solid prouct (II). Ethylene was polymerized as in Example 1.

EXAMPLE 12

Preparation of catalyst and production of ethylene polymer were carried out as in Example 1 except that 110 g of magnesia cement ($3MgO.MgCl_2.4H_2O$) was employed in place of magnesium hydroxide and reaction of the two was carried out at 100° C. for 24 hours.

EXAMPLE 13

70 Grams of ferric chloride (anhydrous) and 80 g of manganese chloride ($MnCl_2.4H_2O$) were mixed and milled as in Example 1 to obtain solid product (I). 100 Grams of this solid product (I), 50 g of methylhydrogenpolysiloxane (same as in Example 10), 10 g of titanium tetrachloride and 100 ml of xylene were at the same time admixed together, followed by reaction as in Example 1 to obtain 101 g of solid product (II).

Ethylene was polymerized under the same conditions as in Example 1.

Comparative test 8

Employing the solid product (I) of Example 12, a final solid product was prepared and ethylene was polymerized as in Comparative test 1.

In any of the above-mentioned Examples 1–13, it was observed through a microscope that the polymer particle had a very good form, and also no adherence of polymer onto the wall of the polymerization vessel was observed. In case of Comparative tests 1–8, convex and concave were observed on the surface of polymer particle though they were a little, and also adherence of polymer onto the wall of the polymerization vessel was observed to a certain extent. Other results of these Examples and Comparative tests are shown in Table 1.

TABLE 1

| Example (Comparative test) | Content of transition metal in solid product (II) or final solid product (mg/g) | Polymer yield (g) per g of solid product (II) or final solid product | per g of transition metal | Physical properties of polymer BD | YI | MI |
|---|---|---|---|---|---|---|
| Example 1 | 6.5 | 64,200 | $9.9 \times 10^6$ | 0.47 | −0.1 | 5.0 |
| Comparat. test 1 | 7.7 | 22,700 | $2.9 \times 10^6$ | 0.43 | +0.4 | 4.8 |
| Comparat. test 2 | (ratio:1) | 16,000 | $2.6 \times 10^6$ | — | — | — |
| Example 2 | 15.1 | 85,100 | $5.6 \times 10^6$ | 0.47 | −0.2 | 0.8 |
| Example 3 | 5.8 | 70,600 | $9.1 \times 10^6$ | 0.46 | −0.1 | 0.7 |
| Example 4 | 5.8 | 49,000 | $8.6 \times 10^6$ | 0.43 | −0.1 | 3.5 |
| Comparat. test 3 | 10.1 | 20,500 | $2.0 \times 10^6$ | 0.41 | +0.4 | 0.75 |
| Example 5 | 5.3 | 50,500 | $9.5 \times 10^6$ | 0.45 | 0.0 | 2.8 |
| Comparat. test 4 | 14.7 | 18,300 | $1.3 \times 10^6$ | 0.45 | +1.0 | 1.5 |
| Example 6 | 6.1 | 48,900 | $8.0 \times 10^6$ | 0.40 | +0.1 | 1.8 |
| Comparat. test 5 | 17.5 | 20,100 | $1.1 \times 10^6$ | 0.36 | +1.1 | 1.4 |
| Example 7 | 6.4 | 40,500 | $6.3 \times 10^6$ | 0.43 | +0.1 | 4.5 |
| Comparat. test 6 | 13.7 | 14,500 | $1.1 \times 10^6$ | 0.40 | +1.4 | 2.5 |
| Example 8 | 6.8(V)* | 41,200 | $6.1 \times 10^6$ | 0.40 | +0.1 | 1.4 |
| Comparat. test 7 | 14.2(V) | 16,700 | $1.2 \times 10^6$ | 0.36 | +1.5 | 0.8 |
| Example 9 | 6.4(V) | 53,800 | $8.4 \times 10^6$ | 0.45 | 0.0 | 0.83 |
| Example 10 | 14.5 | 75,200 | $5.2 \times 10^6$ | 0.47 | −0.1 | 1.2 |
| Example 11 | 16.3 | 77,400 | $4.7 \times 10^6$ | 0.45 | −0.1 | 3.5 |
| Example 12 | 3.8 | 64,500 | $9.8 \times 10^6$ | 0.45 | +0.3 | 4.8 |
| Example 13 | 15.3 | 47,600 | $3.1 \times 10^6$ | 0.45 | 0.0 | 2.7 |

TABLE 1-continued

| Example (Comparative test) | Content of transition metal in solid product (II) or final solid product (mg/g) | per g of solid product (II) or final solid product | per g of transition metal | Physical properties of polymer BD | YI | MI |
|---|---|---|---|---|---|---|
| Comparat. test 8 | 7.5 | 23,000 | $3.1 \times 10^6$ | 0.43 | +0.4 | 1.4 |

*(V) shows the vanadium atom-containing cases, and others all show the titanium atom-containing cases.

EXAMPLE 14

Employing the solid product (II) obtained in Example 1, ethylene-propylene copolymerization was carried out.

3.5 L of n-hexane, 149 mg of triisobutylaluminum and 15 mg of solid product (II) were introduced into a stainless steel polymerization vessel, and then 250 g of propylene was added, and they were subjected to polymerization reaction under a hydrogen partial pressure of 0.5 kg/cm² (gauge) and an ethylene partial pressure of 9.0 kg/cm² (gauge), at 80° C. for 6 hours. After completion of the reaction, the resulting slurry was separated by filtration without deashing and dried to obtain 1186 g of a white ethylene-propylene copolymer.

EXAMPLE 15

Employing the solid product (II) obtained in Example 4, ethylene-propylene copolymerization was carried out as in Example 14.

EXAMPLE 16

Ethylene-butene-1 copolymerization was carried out as in Example 14 except that 3.5 l of n-heptane was employed in place of n-hexane and 1300 g of butene-1 was employed in place of propylene.

EXAMPLE 17

Ethylene-butene-1 copolymerization was carried out under the same conditions as in Example 16 except that 20 mg of solid product (II) of Example 8 and 114 mg of triethylaluminum were employed.

EXAMPLE 18

Ethylene-butene-1 copolymerization was carried out as in Example 17 except that solid product (II) of Example 12 and 150 g in place of 300 g, of butene-1 were employed.

In Examples 14–18, the form of polymer particle was good and no adherence thereof onto the polymerization vessel was observed. Other results are shown in Table 2.

TABLE 2

| Example | Solid product (II) | Monomer | per g of solid product | per g of transition metal | Physical properties of polymer BD | YI | MI | Comonomer content (%) |
|---|---|---|---|---|---|---|---|---|
| Example 14 | Ex. 1 | Ethylene-propylene | 79,040 | $1.2 \times 10^7$ | 0.42 | −0.1 | 2.5 | Propylene 9.4 |
| Example 15 | Ex. 4 | Ethylene-propylene | 50,760 | $1.0 \times 10^7$ | 0.42 | −0.1 | 2.2 | Propylene 7.6 |
| Example 16 | Ex. 1 | Ethylene-butene | 81,620 | $1.3 \times 10^7$ | 0.41 | −0.1 | 1.8 | Butene 5.0 |
| Example 17 | Ex. 8 | Ethylene-butene | 47,400 | $7.0 \times 10^6$ | 0.42 | +0.1 | 2.2 | Butene 6.9 |
| Example 18 | Ex. 12 | Ethylene-butene | 74,170 | $2.0 \times 10^7$ | 0.45 | −0.1 | 5.0 | Butene 2.2 |

EXAMPLE 19

Employing the solid product (II) obtained in Example 1, propylene polymerization was carried out. 3.5 L of n-hexane, 121 mg of diethylaluminium chloride and 20 mg of solid product (II) were introduced into a stainless steel polymerization vessel, and polymerization reaction was carried out under a propylene partial pressure of 10 kg/cm² (gauge), at 70° C. for 4 hours. The polymer yield was 5,510 g (polymer)/g (solid product (II)) and $0.8 \times 10^6$ g (polymer)/g (Ti atom). The polymer had a good form and a BD of 0.48.

EXAMPLE 20

Propylene polymerization was carried out under the same conditions as in Example 19 except that 20 mg of the solid product (II) obtained in Example 11 and 114 mg of triethylaluminum were employed. 108 Grams of polymer was obtained. The polymer yields was 5,400 g (polymer)/g (solid product (II)) and $0.3 \times 10^6$ g (polymer)/g (Ti atom), and the polymer had a good form, and no adherence of polymer onto the wall of the polymerization vessel was observed.

EXAMPLE 21

Solid product (II) of Example 1 was employed and 500 g of butene-1 was fed. Polymerization was carried out at 70° C. for 4 hours under the polymerization conditions as in Example 19. 400 Grams of polybutene was obtained. The polymer yield was 20,000 g (polymer)/g (solid product (II)).

EXAMPLE 22

Butene-1 polymerization was carried out under the same polymerization conditions as in Example 20 except that 20 mg of the solid product (II) obtained in Example 6 and 200 mg of triisobutylaluminum were employed. 385 Grams of polymer was obtained. The polymer yield was 19,250 g (polymer)/g (solid product (II)).

In the following Examples 23-40, polysiloxane was employed as an electron donor, and the above-mentioned embodiment (4) was carried out, i.e. polysiloxane and said compound of transition metal were in advance admixed, and said solid product (I) was then mixed with the resulting mixture, and reacted together.

EXAMPLE 23

(1) Preparation of solid product (II)

50 Ml of toluene and 17.3 g (10 ml) of titanium tetrachloride were introduced into a reactor, and then 10 g (10 ml) of dimethylpolysiloxane (Toshiba silicone oil TSF-451-100 (trademark), viscosity: 100 centistokes) was dropwise added, and they were reacted further for 10 minutes.

After completion of the reaction, 20 g of the solid product (I) obtained in Example 1 was added, and reaction was carried out at 120° C. for one hour, followed by cooling, filtering-off, repeated washings with n-hexane till polysiloxane and titanium tetrachloride were not detected in the filtrate, and drying to obtain a solid product (II). The content of Ti atom in 1 g of the solid product (II) was 4.5 mg.

(2) Ethylene polymerization 3.5 L of n-hexane, 420 mg of triisobutylaluminum and 25 mg of solid product (II) were introduced into a stainless steel reactor and then subjected to polymerization reaction under a hydrogen pressure of 3 kg/cm² G and an ethylene pressure of 10 kg/cm² G, at a polymerization temperature of 85° C. for 5 hours. After completion of the reaction, the resulting slurry was filtered off without deashing and dried to obtain 1,320 g of a white ethylene polymer. The polymer yield of solid product (II) per g was 52,800 g and hence its catalyst efficiency was very high. Further the polymer yield of solid product (II) per g of Ti atom was $1.17 \times 10^7$ g and hence the catalyst efficiency thereof per Ti atom was very high. The polymer had a BD of 0.45 and a uniform spherical form, and also although deashing step was ommited, the polymer was white without any coloration and had a YI of 0.1 and a MI of 1.5.

Comparative test 9

100 Grams of the solid product (I) obtained in Example 1, 200 ml (345 g) of TiCl₄ (without any reaction of dimethylpolysiloxane) and 100 ml of toluene were introduced into a reactor, and then reacted at 110° C. for one hour. Except for this, a final solid product was obtained as in Example 23.

Employing this final solid product, ethylene polymerization was carried out as in Example 23.

As the resulting polymer was compared with the polymer obtained in Example 23, the former was notably colored, and it was found that deashing step could not be ommited. From these results, it can been seen that the effectivenesses of the present invention exhibited in Example 23 is remarkable.

Comparative test 10

Preparation of catalyst and production of ethylene polymer were carried out according to Example 1 of the above-mentioned U.S. Pat. No. 3,987,233 and comparison was made.

To 100 g of the solid product (I) obtained in Example 1 of the present invention were added 250 ml of toluene and 50 g (50 ml) of dimethylpolysiloxane (same as in Example 23), and they were reacted together at 120° C. for 2 hours, followed by decantation, and further repeated decantations by the addition of toluene. 50 Ml (86.5 g) of TiCl₄ was added, 100 ml of toluene was further added and reaction was carried out at 110° C. for one hour, and thereafter a final solid product was obtained in the same manner as in Example 23. Employing this final solid product, ethylene polymerization was carried out as in Example 23.

EXAMPLE 24

Preparation of catalyst and production of ethylene polymer were carried out as in Example 23 except that 20 g (20 ml) of methylhydrogenpolysiloxane (same as in Example 10) was employed in place of dimethylpolysiloxane.

Comparative test 11

Preparation of catalyst and production of ethylene polymer were carried out as in Comparative test 10, except that 20 g of methylhydrogenpolysiloxane (same as in Example 24) was employed in place of dimethylpolysiloxane.

EXAMPLE 25

Preparation of catalyst and production of ethylene polymer were carried out as in Example 23, except that 8 g (8 ml) of methylphenylpolysiloxane (viscosity: 200 centistokes) was employed in place of dimethylpolysiloxane.

Comparative test 12

Preparation of catalyst and production of ethylene polymer were carried out as in Comparative test 10, except that 8 g of methylphenylpolysiloxane (same as in Example 25) was employed in place of dimethylpolysiloxane.

EXAMPLE 26

Preparation of catalyst and production of ethylene polymer were carried out as in Example 23, except that 4 g (4 ml) of diphenylpolysiloxane (viscosity: 800 centistokes) was employed in place of dimethylpolysiloxane.

Comparative test 13

Preparation of catalyst and production of ethylene polymer were carried out as in Comparative test 10, except that 4 ml of diphenylpolysiloxane (same as in Example 26) was employed in place of dimethylpolysiloxane.

The results of the above-mentioned Example 23-26 and Comparative tests 9-13 are shown in Table 3.

TABLE 3

|  |  | Content of transition metal in solid product (II) or final solid product (mg/g) | Polymer yield per g of solid product (II) or final solid product (g) | Polymer yield per g of transition metal (g) | BD | YI | MI |
|---|---|---|---|---|---|---|---|
| Example | 23 | 4.5 | 52,800 | $1.17 \times 10^7$ | 0.45 | 0.1 | 1.5 |
| Compar. test | 9 | 5.0 | 4,250 | $0.85 \times 10^6$ | 0.21 | 7.5 | 0.15 |
| Compar. test | 10 | 8.9 | 21,800 | $2.4 \times 10^6$ | 0.41 | 0.7 | 3.2 |
| Example | 24 | 2.0 | 64,500 | $3.2 \times 10^7$ | 0.45 | −0.1 | 2.6 |
| Compar. test | 11 | 16.6 | 18,300 | $1.1 \times 10^6$ | 0.40 | 0.8 | 2.1 |
| Example | 25 | 4.2 | 49,800 | $1.2 \times 10^7$ | 0.44 | 0.0 | 3.2 |
| Compar. test | 12 | 16.5 | 16,500 | $1.0 \times 10^6$ | 0.41 | 0.6 | 2.1 |
| Example | 26 | 3.8 | 38,400 | $1.0 \times 10^7$ | 0.43 | −0.2 | 1.8 |
| Compar. test | 13 | 15.8 | 13,400 | $0.85 \times 10^6$ | 0.40 | 0.8 | 1.6 |

EXAMPLES 27–32

Catalyst preparations were carried out employing a solid product (I) obtained in the same manner as in Example 1 (except that magnesium hydroxide was replaced by suitable amounts of other divalent metal compounds, and in Examples 30 and 32, 40 g and 60 g of AlCl$_3$ (anhydrous) were employed, respectively, and the reactions with the divalent metal compounds were carried out at 230° C. for 5 hours and at 90° C. for 40 hours, respectively), and in the same manner as in Example 23, and then productions of ethylene polymerization were carried out.

Names of divalent metal compounds employed and their amounts employed and polymerization results are shown in Table 4.

110° C. for 5 hours, followed by further milling in a ball mill for 50 hours to obtain fine solid product (I).

Next, 487 g (300 ml) of tetrachloroethylene, 30 g of trichloromonobutoxytitanium and 80 ml (80 g) of dimethylpolysiloxane (500 centistokes) were admixed together at 20° C. and then reacted at 90° C. for 2 hours. After the reaction, the reaction product was cooled down to 20° C., and 20 g of said solid product (I) was introduced and reaction was carried out at 120° C. for 30 minutes, followed by cooling. Catalyst preparation was carried out and production of ethylene polymer was carried out, as in Example 23.

EXAMPLE 35

80 Grams of manganese chloride (tetrahydrate salt) and 90 g of aluminum trichloride (anhydrous) were

TABLE 4

|  | Divalent metal compound (amount used, (g)) | Content of transition metal in solid product (II) (mg/g) | Polymer yield (g) Per g of solid product (II) | Per g of transition metal | Physical properties of polymer BD | YI | MI |
|---|---|---|---|---|---|---|---|
| Example 27 | Magnesium oxide (90) | 2.7 | 48,000 | $1.8 \times 10^7$ | 0.41 | −0.2 | 1.2 |
| Example 28 | Magensium carbonate (108) | 3.2 | 29,300 | $0.9 \times 10^7$ | 0.43 | +0.2 | 1.8 |
| Example 29 | Magnesium chloride (35) | 2.9 | 23,400 | $0.8 \times 10^7$ | 0.38 | +0.3 | 0.85 |
| Example 30 | Hydromagnesite (108) | 3.1 | 31,100 | $1.0 \times 10^7$ | 0.43 | +0.1 | 1.1 |
| Example 31 | Hydrotalcite (70) | 3.8 | 23,000 | $0.6 \times 10^7$ | 0.40 | +0.2 | 0.65 |
| Example 32 | Magnesia cement (90) | 3.2 | 38,400 | $1.2 \times 10^7$ | 0.44 | +0.0 | 2.4 |

EXAMPLE 33

70 Grams of aluminummagnesium oxide (MgAl$_2$O$_4$) and 58 g of aluminum trichloride (anhydrous) were admixed and milled in a ball mill for 100 hours, and then reacted on heating at 290° C. for 2 hours, followed by milling in a ball mill for 10 hours to obtain fine solid product (I).

Next, 173 g (100 ml) of titanium tetrachloride was added to 100 ml of n-decane, and then 10 g (10 ml) of methylhydrogenpolysiloxane (same as in Example 24) was further added at 0° C., followed by still-standing for 2 hours for carrying out reaction. To the resulting reaction product was added 100 g of said solid product (I) and reaction was carried out at 180° C. for 3 hours. After completion of the reaction, catalyst preparation was carried out as in Example 23 and production of ethylene polymer was carried out.

EXAMPLE 34

78 Grams of magnesiumcalcium carbonate (CaMg(CO$_3$)$_2$) and 60 g of ferric trichloride (anhydrous) were admixed in a ball mill for 24 hours and then heated at admixed and milled in a vibration mill for one hour, and then reacted at 180° C. for 8 hours, followed by cooling and further, milling in a vibration mill for 30 minutes to obtain a fine solid product (I).

Next, 100 g (100 ml) of dimethylpolysiloxane (100 centistokes) and 145 g (80 ml) of vanadium tetrachloride were admixed and then reacted at 50° C. for one minute, and 50 g of said solid product (I) was added, followed by reaction at 70° C. for 4 hours. After completion of the reaction, catalyst was prepared and production of ethylene polymer was carried out as in Example 23.

The results of Examples 33–35 are shown in Table 5.

TABLE 5

|  | Content of transition metal in solid product (II) (mg/g) | Polymer yield (g) Per g of solid product (II) | Per g of transition metal | Physical properties of polymer BD | YI | MI |
|---|---|---|---|---|---|---|
| Example 33 | 1.7 | 42,600 | $2.5 \times 10^7$ | 0.42 | −0.1 | 3.6 |

TABLE 5-continued

| | Content of transition metal in solid product (II) (mg/g) | Polymer yield (g) | | Physical properties of polymer | | |
|---|---|---|---|---|---|---|
| | | Per g of solid product (II) | Per g of transition metal | BD | YI | MI |
| Example 34 | 3.8 | 19,000 | 0.5 × 10⁷ | 0.35 | +0.5 | 0.50 |
| Example 35 | 1.2 | 43,800 | 3.8 × 10⁷ | 0.41 | +0.1 | 1.4 |

EXAMPLE 36

380 Mg of triethylaluminum and 18 mg of the solid product (II) of Example 23 were introduced into 3.5 l of n-heptane, and then 250 g of propylene was added. Ethylene-propylene copolymerization was carried out under a hydrogen pressure of 0.5 kg/cm$^2$G and an ethylene pressure of 9 kg/cm$^2$G, at 80° C. for 4 hours. After completion of the reaction, the resulting slurry was separated by filtration without ash-removal, and dried to obtain 1,200 g of a white copolymer.

The form of the polymers obtained according to the above-mentioned Examples was of a much superior powdery form closer to spherical form, for example, as compared with that of Comparative test 10, even by naked eye observation.

EXAMPLE 37

Ethylene-propylene copolymerization was carried out as in Example 36, except that as solid product (II), that of Example 24 was employed, 3.5 l of n-hexane was employed in place of n-heptane and 300 g of butene-1 was employed in place of propylene.

EXAMPLE 38

3.5 L of n-hexane, 480 mg of monoethoxydiethylaluminum (Et$_2$Al(OEt)) and 48 mg of solid product (II) of Example 27 were introduced into a polymerization reactor, and then 180 g of styrene was added. Ethylene-styrene copolymerization reaction was carried out under a hydrogen pressure of 1 kg/cm$^2$G and an ethylene pressure of 8 kg/cm$^2$G, at 70° C. for 5 hours.

The results of Examples 36-38 are shown in Table 6.

TABLE 6

| | Solid product (II) | Monomer | Polymer yield (g) | | Physical properties of polymer | | | Content of comonomer (wt. %) |
|---|---|---|---|---|---|---|---|---|
| | | | per g of solid product (II) | Per g of transition metal | BD | YI | MI | |
| Example 36 | Ex. 23 | Ethylene-propylene | 66,600 | 1.5 × 10⁷ | 0.41 | −0.1 | 0.56 | Propylene 8.5 |
| Example 37 | Ex. 24 | Ethylene-butene | 59,800 | 1.3 × 10⁷ | 0.40 | −0.2 | 0.05 | Butene 10.0 |
| Example 38 | Ex. 27 | Ethylene-styrene | 24,500 | 0.5 × 10⁷ | 0.39 | 0.2 | 0.93 | Styrene 6.3 |

EXAMPLE 39

Employing as solid product (II), that of Example 33, and under the catalyst conditions of Example 23, propylene polymerization reaction was carried out under a propylene partial pressure of 10 kg/cm$^2$ at 70° C. for 4 hours. The polymer yield was 4,980 g (polymer)/g (solid product (II)) and the polymer yield per g of Ti atom was $1.1 \times 10^6$ g (polymer)/g (Ti atom). The YI was 0.1.

EXAMPLE 40

Employing as solid product (II), that of Example 35, and under the catalyst conditions of Example 23, and employing 500 g of butene-1 feed, polymerization was carried out at 70° C. for 4 hours. The polymer yield was 3,840 g (polymer)/g (solid product (II)) and $8.5 \times 10^5$ g (polymer)/g (Ti atom), and YI was 0.1.

In the following Examples 41 and 42, polysiloxane was employed as an electron donor, and these Examples correspond to the above-mentioned embodiments (2) and (3).

EXAMPLE 41

100 Grams of the solid product (I) obtained in Example 1 and 100 g of dimethylpolysiloxane (same as in Example 1) were added to 100 ml of toluene and mixed together at 20° C., and then 173 g of titanium tetrachloride was admixed at the same temperature. Reaction was carried out with stirring at 110° C. for 2 hours. Thereafter preparation of solid product (II) and ethylene polymerization were carried out as in Example 1.

EXAMPLE 42

100 Grams of the solid product (I) obtained in Example 1 and 173 g of titanium tetrachloride were added to 100 ml of toluene at 20° C., and mixed together, and then 100 g of dimethylpolysiloxane (same as in Example 1) was admixed at the same temperature. Thereafter, preparation of solid product (II) and ethylene polymerization were carried out as in Example 1. The results are shown in Table 7.

TABLE 7

| | Content of solid product in transition metal (mg/g) | Polymer yield (g) | | Physical properties of polymer | | |
|---|---|---|---|---|---|---|
| | | Per g of solid product (II) | Per g of transition metal | BD | YI | MI |
| Example 41 | 5.8 | 62,500 | 10.8 × 10⁶ | 0.45 | −0.1 | 5.6 |
| Example 42 | 6.7 | 66,600 | 9.9 × 10⁶ | 0.45 | −0.1 | 4.5 |

In the following Examples, various embodiments of preparation of solid product (II) wherein compounds other than polysiloxane are employed as electron donor will be shown.

EXAMPLE 43

(1) Preparation of solid product (II)

130 Grams of di-n-butyl ether was slowly dropwise added with stirring to a solution of 100 g of titanium tetrachloride in 100 ml of toluene maintained at 20° C. Thereafter, reaction was further continued for 30 minutes.

To the resulting toluene solution of reaction product was added 100 g of the solid product (I) of Example 1, and then reaction was carried out with stirring at 110° C. for 2 hours. After completion of the reaction, the reaction product was separated by filtration and repeatedly washed with hexane until titanium tetrachloride and butyl ether were not detected, followed by vacuum drying to obtain 97 g of solid product (II). The titanium content in 1 g of solid product (II) was 6.2 mg.

(2) Ethylene polymerization 3.5 L of n-hexane, 300 mg of triisobutylaluminum and 25 mg of said solid product (II) were introduced into a stainless steel polymerization vessel, and polymerization reaction was carried out under a hydrogen pressure of 3 kg/cm$^2$G and an ethylene pressure of 10 kg/cm$^2$G (the total pressure: 13.8 kg/cm$^2$G), at a polymerization temperature of 85° C. for 5 hours. After completion of the reaction, the resulting slurry was separated by filtration without ash-removal, and dried to obtain 1,563 g of a white polyethylene.

The polymer yield was 62,500 g (polymer)/g (solid product (II)) and $1.0 \times 10^7$ g (polymer)/g (Ti atom), and hence the catalyst efficiency was very high. The polymer had a BD of 0.44, and according to observation through a microscope, the polymer had a spherical form and its particle diameter was uniform (polymers of 32 mesh–325 mesh occupying 85% by weight or higher of the total polymers), and a smooth particle surface. Although ash-removal step was ommited, the polymer was white and had a YI of −0.2 and a MI of 4.5. Further no adherence of polymer onto the wall of the polymerization vessel and to the stirrer was observed.

Comparative test 14

100 Grams of the solid product (I) obtained in Example 1 was added to a solution of 130 g of di-n-butyl ether and 100 ml of toluene, and then reaction was carried out with stirring at 110° C. for 2 hours, followed by filtering-off and repeated washings with hexane. The resulting solid product was introduced into 100 ml of toluene and 100 g of titanium tetrachloride was added, followed by reaction at 110° C. for one hour. After completion of the reaction, washing and drying were carried out as in Example 43 to obtain a final solid product.

Employing 25 mg of this final solid product, ethylene polymerization was carried out as in Example 43.

EXAMPLE 44

100 Grams of the solid product (I) of Example 1, 100 g of titanium tetrachloride and 130 g of di-n-butyl ether were at the same time added to 100 ml of toluene maintained at 20° C. with stirring. Reaction was then carried out at 110° C. for 2 hours. After completion of the reaction, washing and drying were carried out as in Example 43 to obtain 96 g of solid product (II).

Employing this solid product, ethylene polymerization was carried out as in Example 43.

EXAMPLE 45

100 Grams of the solid product (II) of Example 4 and 60 g of n-butyl acetate were added to 150 ml of hexane maintained at 20° C. with stirring, and then 100 g of titanium tetrachloride was added. Reaction was carried out at 50° C. for 4 hours. Thereafter, preparation of solid product (II) and ethylene polymerization were carried out as in Example 43.

Comparative test 15

100 Grams of the solid product (II) of Example 4 and 60 g of n-butyl acetate were introduced into 150 ml of hexane, and reaction was carried out at 50° C. for 24 hours, followed by filtering-off and washing with hexane. The resulting solid product was introduced into 150 ml of hexane, and 100 g titanium tetrachloride was added. Reaction was carried out at 50° C. for 24 hours. Thereafter, preparation of final reaction product and ethylene polymerization were carried out as in Example 43.

EXAMPLE 46

100 Grams of the solid product (I) of Example 5 and 50 g of titanium tetrachloride were added to 100 ml of heptane maintained at 0° C. with stirring, and mixed together. 100 Grams of diethyl ketone was then added, and reaction was carried out at 90° C. for 5 hours. Thereafter preparation of solid product (II) and ethylene polymerization were carried out as in Example 43.

Comparative test 16

100 Grams of the solid product (I) of Example 5 and 50 g of titanium tetrachloride were added to 100 ml of heptane, and mixed together, followed by reaction at 90° C. for 5 hours. Thereafter 100 g of diethyl ketone was added, and further, reaction was carried out on heating at 90° C. for 5 hours. After completion of the reaction, preparation of final solid product and ethylene polymerization were carried out as in Example 43.

EXAMPLE 47

160 Grams of p-butyric anhydride was introduced into 100 ml of xylene, and while maintaining the resulting solution at 20° C., 180 g of titanium tetrachloride was added to the solution, followed by stirring for 20 minutes. Thereafter 100 g of the solid product (I) of Example 6 was added, and reaction was carried out at 130° C. for 1.5 hour. Thereafter preparation of solid product (II) and ethylene polymerization were carried out as in Example 43.

Comparative test 17

160 Grams of n-butyric anhydride and 100 g of the solid product (I) of Example 6 were admixed in 100 ml of xylene, and then reacted on heating at 130° C. for 1.5 hour. 180 Grams of titanium tetrachloride was then dropwise added, and successively reaction was carried out at 130° C. for one hour. Thereafter, preparation of final solid product and ethylene polymerization were carried out as in Example 43.

EXAMPLE 48

300 Grams of diphenyl ether and 100 g of vanadium oxytrichloride were reacted together at 40° C. for 10 minutes, and 100 g of the solid product (I) of Example 7 was then added into the resulting reaction product, to react them with stirring at 200° C. for 15 minutes. After completion of the reaction, preparation of solid product (II) and ethylene polymerization were carried out as in Example 43.

EXAMPLE 49

100 Grams of the solid product (I) of Example 8, g of n-butyraldehyde and 190 g of vanadium tetrachloride were mixed at the same time together in 100 ml of octane maintained at 20° C., and reaction was then carried out at 70° C. for 15 hours. After completion of the reaction, solid product (II) was obtained in the same manner as in Example 43.

Ethylene polymerization was carried out as in Example 43 except that 25 mg of this solid product (II) and 171 mg of triethylamine were employed.

EXAMPLE 50

75 Grams of propionic acid and 190 g of titanium tetrachloride were mixed together in 100 ml of toluene maintained at 20° C., followed by still-standing at 20° C. for 30 minutes. 100 Grams of the solid product (I) of Example 9 was added thereinto, and reaction was carried out at 100° for 3 hours. After completion of the reaction, preparation of solid product (II) and ethylene polymerization were carried out as in Example 43.

EXAMPLE 51

To 100 ml of toluene maintained at 10° C. were added 50 g of the solid product (I) of Example 10, and then 90 g of n-amylamine and successively 250 g of tetrabutoxytitanium, and they were mixed together and reacted at 90° C. for 5 hours. After completion of the reaction, preparation of solid product (II) and ethylene polymerization were carried out as in Example 43.

EXAMPLE 52

60 Grams of propionitrile and 180 g of titanium tetrachloride were mixed together in 100 ml of toluene maintained at 20° C., and reaction was carried out at 50° C. for 5 minutes. Thereafter 100 g of the solid product (I) of Example 12 was added and reaction was carried out at 80° C. for 7 hours. After completion of the reaction, preparation of solid product (II) and ethylene polymerization were carried out as in Example 43.

EXAMPLE 53

200 Grams of ethyl benzoate and 50 g of dimethylpolysiloxane were mixed together, and to the mixture maintained at 20° C. was added 100 g of titanium tetrachloride, followed by stirring for 30 minutes. To the resulting solution was added 100 g of the solid product (I) of Example 13, and reaction was carried out at 130° C. for one hour. After completion of the reaction, preparation of solid product (II) and ethylene polymerization were carried out as in Example 43.

EXAMPLE 54

120 Grams of triethylphosphine and 95 g of titanium tetrachloride were mixed together in 100 ml of o-dichlorobenzene maintained at 60° C., and reaction was carried out for 30 minutes. To the reaction product was added 100 g of the solid product (I) of Example 1, and reaction was carried out at 150° C. for 40 minutes. After completion of the reaction, preparation of solid product (II) and ethylene polymerization were carried out as in Example 43.

EXAMPLE 55

90 Grams of diethylsulfide and 95 g of titanium tetrachloride were mixed together in 100 ml of toluene maintained at 30° C. After lapse of 30 minutes, 100 g of the solid product (I) of Example 1 was added, and reaction was carried out as in Example 43.

EXAMPLE 56

3.5 L of n-hexane, 280 mg of triisobutylaluminum and 15 mg of the solid product (II) obtained in Example 43 were introduced into a stainless steel polymerization vessel, and then 250 g of propylene was added, and then ethylene-propylene copolymerization reaction was carried out under a hydrogen partial pressure of 0.5 kg/cm$^2$G and an ethylene partial pressure of 9.0 kg/cm$^2$G, at 80° C. for 5 hours. After completion of the reaction, the resulting slurry was filtered off without ash-removal (deashing) and dried to obtain 981 g of a white copolymer.

EXAMPLE 57

Ethylene-propylene copolymerization was carried out as in Example 56, except that as solid product (II), that of Example 45 was employed and 160 mg of triethylaluminum was employed in place of triisobutylaluminum.

EXAMPLE 58

Ethylene-butene copolymerization was carried out as in Example 56, except that 3.5 l of n-heptane was employed in place of n-hexane, and butene-1 was employed in place of propylene.

EXAMPLE 59

Ethylene-butene copolymerization was carried out under the same conditions as in Example 58, except that 15 mg of the solid product (II) of Example 48 and 160 mg of triethylaluminum were employed.

In any of the above-mentioned Examples 43–59, the form of polymer particle was very good, and adherence of polymer onto the wall of the polymerization vessel was scarcely or not observed. In comparative tests 14–17, convex and concave were observed on the surface of polymer particle although they were slight, and adherence of polymer onto the wall of the polymerization vessel was observed to a certain extent. The results of these Examples and Comparative tests are shown in Table 8.

TABLE 8

|  |  | Content of transition metal in solid product (II) or final solid product mg/g | Polymer yield (g) Per g of said product (II) or final solid product | Per g transition metal | Physical properties of polymer BD | YI | MI |
|---|---|---|---|---|---|---|---|
| Example | 43 | 6.2 | 62,500 | 1.0 × 10$^7$ | 0.44 | −0.2 | 4.5 |
| Compar. test | 14 | 12.0 | 17,400 | 1.5 × 10$^6$ | 0.36 | +0.5 | 4.1 |

TABLE 8-continued

| | | Content of transition metal in solid product (II) or final solid product mg/g | Polymer yield (g) | | Physical properties of polymer | | |
|---|---|---|---|---|---|---|---|
| | | | Per g of said product (II) or final solid product | Per g transition metal | BD | YI | MI |
| Example | 44 | 5.9 | 61,100 | $1.0 \times 10^7$ | 0.44 | −0.2 | 4.7 |
| Example | 45 | 7.5 | 53,500 | $7.1 \times 10^6$ | 0.40 | −0.1 | 4.4 |
| Compar. test | 15 | 13.4 | 20,500 | $1.5 \times 10^6$ | 0.37 | +0.4 | 2.5 |
| Example | 46 | 7.8 | 48,900 | $6.3 \times 10^6$ | 0.40 | −0.1 | 2.9 |
| Compar. test | 16 | 16.7 | 7,00 | $4.7 \times 10^5$ | 0.27 | +3.0 | 0.78 |
| Example | 47 | 5.8 | 58,200 | $1.0 \times 10^7$ | 0.45 | −0.2 | 3.7 |
| Compar. test | 17 | 12.8 | 19,700 | $1.5 \times 10^6$ | 0.38 | +0.2 | 1.2 |
| Example | 48 | 8.2 | 45,300 | $5.5 \times 10^6$ | 0.39 | +0.1 | 1.7 |
| Example | 49 | 6.6 | 44,200 | $6.7 \times 10^6$ | 0.40 | +0.1 | 1.5 |
| Example | 50 | 8.1 | 51,000 | $6.3 \times 10^6$ | 0.42 | −0.2 | 3.2 |
| Example | 51 | 7.4 | 42,300 | $5.7 \times 10^6$ | 0.41 | −0.1 | 3.5 |
| Example | 52 | 5.8 | 39,800 | $6.9 \times 10^6$ | 0.45 | 0 | 1.1 |
| Example | 53 | 7.3 | 55,400 | $7.6 \times 10^6$ | 0.43 | +0.1 | 3.9 |
| Example | 54 | 8.7 | 41,500 | $4.8 \times 10^6$ | 0.37 | 0 | 1.8 |
| Example | 55 | 9.1 | 38,700 | $4.3 \times 10^6$ | 0.36 | +0.2 | 1.5 |
| Example | 56 | 6.2 | 65,400 | $1.1 \times 10^7$ | 0.42 | −0.2 | 5.0 |
| Example | 57 | 7.5 | 55,700 | $7.4 \times 10^6$ | 0.39 | −0.1 | 4.8 |
| Example | 58 | 6.2 | 61,100 | $9.9 \times 10^6$ | 0.42 | −0.2 | 4.8 |
| Example | 59 | 8.2 | 47,500 | $5.8 \times 10^6$ | 0.38 | +0.1 | 2.0 |

EXAMPLES 60–67 and Comparative test 18

Employing the solid products (II) of Examples 43–53, propylene was polymerized. 3.5 L of n-hexane, 180 mg of diethylaluminum chloride and 25 mg of solid product (II) were introduced into a stainless steel polymerization vessel, and polymerization reaction was carried out under a hydrogen partial pressure of 0.5 kg/cm²G and a propylene partial pressure of 9 kg/cm²G, at 70° C. for 4 hours. After completion of the reaction, the solvent was removed by vaporization to obtain a polymer. In Comparative test 18, propylene was polymerized employing the final solid product obtained in Comparative test 14. These results are shown in Table 9.

In comparison of Example 60 with Comparative test 18, it can be seen that the effectivenesses of the present invention are further notable.

TABLE 9

| | | Polymer yield (g) | | | |
|---|---|---|---|---|---|
| | Solid product (II) | Per g of solid product (II) | Per g of transition metal | Isotactic* Index | MFR** |
| Example 60 | Example 43 | 23,500 | $3.8 \times 10^6$ | 0.90 | 4.5 |
| Example 61 | Example 45 | 21,300 | $2.8 \times 10^6$ | 0.92 | 4.2 |
| Example 62 | Example 46 | 20,900 | $2.7 \times 10^6$ | 0.92 | 3.8 |
| Example 63 | Example 48 | 20,030 | $2.4 \times 10^6$ | 0.89 | 3.7 |
| Example 64 | Example 49 | 19,500 | $3.0 \times 10^6$ | 0.88 | 3.6 |
| Example 65 | Example 50 | 22,700 | $2.8 \times 10^6$ | 0.91 | 5.2 |
| Example 66 | Example 51 | 19,800 | $2.7 \times 10^6$ | 0.92 | 4.9 |
| Example 67 | Example 53 | 21,700 | $3.0 \times 10^6$ | 0.92 | 4.4 |
| Compar. test 18 | Compar. test 14 | 14,500 | $1.2 \times 10^6$ | 0.83 | 2.3 |

*Isotactic index refers to a ratio of the weight of the residue which remained when polymer was extracted with n-heptane at 98° C. (b.p.) for 4 hours, based upon the original weight.
**Meltflow index (according to ASTM D-1238(L))

EXAMPLES 68–71 and Comparative test 19

Butene-1 was polymerized employing the solid products (II) obtained in Examples 43–53. 3.5 L of n-hexane, 180 mg of diethylaluminum chloride and 25 mg of solid product (II) were introduced into a stainless steel polymerization vessel, and 500 g of butene-1 was fed, and then reaction was carried out at 70° C. for 4 hours.

In Comparative test 19, butene was similarly polymerized employing the final solid product obtained in Comparative test 14. These results are shown in Table 10.

In commparison of Example 68 with Comparative test 19, it can be seen that the effectivenesses of the present invention are further notable.

TABLE 10

| | | Polymer yield (g) | |
|---|---|---|---|
| | Solid product (II) | Per g of solid product (II) | Per g of transition metal |
| Example 68 | Example 43 | 15,200 | $2.5 \times 10^6$ |
| Example 69 | Example 45 | 13,800 | $1.8 \times 10^6$ |
| Example 70 | Example 48 | 12,500 | $1.5 \times 10^6$ |
| Example 71 | Example 53 | 14,100 | $1.9 \times 10^6$ |
| Compar. test 19 | Compar. test 14 | 9,100 | $0.76 \times 10^6$ |

What is claimed is:

1. In the method for producing α-olefin polymers employing a catalyst obtained by
   reacting a trivalent metal halide with a divalent metal compound, forming a solid product (I); thereafter
   reacting a siloxane polymer with said solid product (I); thereafter
   reacting a compound of transion metal with the thus obtained product, forming a final solid product; and then
   combining an organoaluminum compound with said final product,
   the improvement which is characterized in that said final product is obtained by
   reacting aluminum trichloride (anhydrous) or ferric chloride (anhydrous) with a hydroxide, an oxide or a carbonate of Mg, Ca, Zn or $Mn^{II}$, a double oxide containing oxide of Mg, Ca, Zn, or $Mn^{II}$, a halogenated hydrate of Mg, Mn, Sn or Ni, a hydrate of double salts containing an oxide and a halide of Mg, Ca, Zn or $Mn^{II}$, a hydrate of double salts containing an oxide of Mg, Ca, Zn or $Mn^{II}$, a hydrate of double salts of a carbonate with a hydroxide both of Mg, Ca, Zn or $Mn^{II}$, a hydrate of a hydroxide-carbonate containing Mg, Ca, Zn or $Mn^{II}$, the mixing proportion being 0.1-20 as expressed by an atomic ratio of the latter to the former, the reaction temperature being 20° C.-500° C., thus obtaining the solid product (I); thereafter mixing (A) said solid product (I), (B) a chain or cyclic siloxane polymer expressed by the general formula

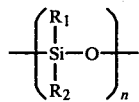

(wherein n represents 3-10,000, and $R_1$ and $R_2$ represent same or different kinds of hydrogen, alkyl group, aryl group, halogen, alkoxy group, aryloxy group, or fatty acid residual group), and (C) a halide, an oxyhalide, an alcoholate, an alkoxyhalide or an acetoxyhalide, of titanium or vanadium (hereinafter referred to as compound of transition metal), by dissolving or dispersing one or two or the total of the above-mentioned (A), (B) or (C) in a solvent in advance, and then reacting (A) with (B) and (C) in the coexistence of (B) said siloxane polymer and (C) said compound of transition metal at a temperature of 50° C.-300° C., the proportion of these (A), (B) and (C) employed being 10-10,000 g of (B) said siloxane polymer based on 100 g of (A) said solid product (I), and 1-1,000 g of (C) said compound of transition metal based on 100 g of (A) said solid product (I), and 10-5,000 g of (C) said compound of transition metal based on 100 g of (B) said siloxane polymer, thus forming a solid product (II).

2. The improvement according to claim 1 wherein the formation reaction of said solid product (II) is carried out by mixing said solid product (I), said siloxane polymer and said compound of transition metal at the same time and reacting them.

3. The improvement according to claim 1 wherein the formation reaction of said solid product (II) is carried out by mixing said solid product (I) with said siloxane polymer, then adding said compound of transition metal to the resulting mixture and thereafter reacting them together.

4. The improvement according to claim 1 wherein the formation reaction of said solid product (II) is carried out by mixing said reaction product (I) with said compound of transition metal, then adding said siloxane polymer to the resulting mixture and thereafter reacting these together.

5. The improvement according to claim 1 wherein the formation reaction of said solid product (II) is carried out by mixing said siloxane polymer with said compound of transition metal, then adding said reaction product (I) to the resulting mixture and thereafter reacting these compounds together.

6. The improvement according to claim 1 wherein said α-olefin polymers are ethylene polymers or copolymers of ethylene with a small amount of propylene, butene-1 or styrene.

7. The improvement according to claim 1 wherein said α-olefin polymers are polypropylene or polybutene-1.

8. The improvement according to claim 5 wherein said mixing of said siloxane polymer with said compound of transition metal is carried out at a temperature of −50° C. to 30° C., and the amount of said solid product (I) employed is 0.1-900 g based upon 100 g of the reaction product of said siloxane polymer with said compound of transition metal.

9. In the method for producing α-olefin polymers employing a catalyst obtained by reacting a trivalent metal halide with a divalent metal compound, forming a solid product (I); thereafter reacting a siloxane polymer with said solid product (I); thereafter reacting a compound of transition metal with the thus obtained product, forming a final solid product; and then combining an organoaluminum compound with said final product, the improvement which is characterized in that said final product is obtained by reacting aluminum trichloride (anhydrous) or ferric chloride (anhydrous) with $Mg(OH)_2$, MgO, $MgCO_3$, $MgCl_2.6H_2O$, $3MgCO_3.Mg(OH)_2.3H_2O$, $Mg_6Al_2(OH)_{16}CO_3.4H_2O$, $3MgO.MgCl_2.4H_2O$, $MgCl_2.4H_2O$, $MgAl_2O_4$ or $CaMg(CO_3)_2$, the mixing proportion being 1-10 as expressed by an atomic ratio of the latter to the former, the reaction temperature being 50° C. to 300° C., thus obtaining the solid product (I); thereafter mixing (A) said solid product (I), (B), a chain or cyclic siloxane polymer having a viscosity of 10-10,000 centistokes at 25° C. and expressed by the general formula

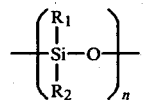

(wherein n represents 3-10,000 and $R_1$ and $R_2$ represent same or different kinds of hydrogen, alkyl group or aryl group), and (C) a halide, an oxyhalide or an alcoholate of titanium or vanadium, by dissolving or dispersing one or two or the total of the above mentioned (A), (B) or (C) in a solvent in advance, and then reacting (A) with (B) and (C) in the coexistence of (B) said siloxane polymer and (C) said compound of transition metal at a temperature of 50° C.-300° C., the proportion of these (A), (B) and (C) employed being 20-1,000 g of (B) said siloxane polymer based on 100 g of (A) said solid product (I), and 10-500 g of (C) said compound of transition metal based on 100 g of (A) said solid product (I), and 30-500 g of (C) said compound of transition metal based on 100 g (B) said siloxane polymer thus forming a solid product (II).

* * * * *